United States Patent
Fife et al.

(10) Patent No.: US 6,426,986 B1
(45) Date of Patent: Jul. 30, 2002

(54) FORGED NOZZLE SHELL COURSE FOR A PRESSURE VESSEL

(75) Inventors: Alex B. Fife, San Jose; Jack T. Matsumoto, Sunnyvale, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/644,378

(22) Filed: Aug. 23, 2000

(51) Int. Cl.[7] .............................................. G21C 13/02
(52) U.S. Cl. ........................ 376/294; 376/293; 220/669; 220/674
(58) Field of Search ................................ 376/293, 294; 220/669, 674

(56) References Cited

U.S. PATENT DOCUMENTS

| | | | |
|---|---|---|---|
| 3,744,660 A | * | 7/1973 | Gaines et al. |
| 4,057,163 A | * | 11/1977 | Widart et al. |
| 4,293,386 A | * | 10/1981 | Harand et al. |
| 4,767,593 A | * | 8/1988 | Wedellsborg |
| 4,892,702 A | * | 1/1990 | Vignes |
| 5,217,681 A | * | 6/1993 | Wedellsborg et al. |
| 5,353,320 A | * | 10/1994 | Challberg et al. |
| 5,442,667 A | * | 8/1995 | Senski |
| 5,465,280 A | * | 11/1995 | Wedellsborg |
| 5,519,741 A | * | 5/1996 | Suzuki et al. |
| 5,721,758 A | | 2/1998 | Fife et al. |
| 5,930,320 A | * | 7/1999 | Challberg et al. |
| 6,188,741 B1 | | 2/2001 | Ballas et al. |

FOREIGN PATENT DOCUMENTS

| | | |
|---|---|---|
| EP | 0 312 421 A | 4/1989 |
| EP | 0 681 301 A1 | 11/1995 |
| FR | 2 317 568 | 2/1977 |
| GB | 854946 | * 11/1960 |
| JP | 62114743 | 5/1987 |
| JP | 11148993 | 6/1999 |

OTHER PUBLICATIONS

European Patent Search dated Sep. 24, 2001.

* cited by examiner

*Primary Examiner*—Michael J. Carone
*Assistant Examiner*—John Richardson
(74) *Attorney, Agent, or Firm*—Armstrong Teasdale LLP

(57) ABSTRACT

A forged nozzle shell course for a pressure vessel includes shell course comprising at least one reinforcement portion extending radially outward from an outer surface of the shell course with each reinforcing portion including a nozzle having a radius. The nozzle includes a bore extending from an outside surface of the reinforcing portion to an inside surface of the shell course, and at least one extension attachment surface located adjacent to and coaxial to the bore. The reinforcing portion having a longitudinal dimension equal to about 2.0 times the radius of the nozzle, and a circumferential dimension equal to about 1.5 times the radius of the nozzle, measured from the centerline of the nozzle bore.

16 Claims, 6 Drawing Sheets

FORGED NOZZLE SHELL COURSE FOR A PRESSURE VESSEL

BACKGROUND OF THE INVENTION

This invention relates generally to reactor pressure vessels and more specifically to reactor pressure vessels including shell courses containing nozzles that are fabricated from a single one-piece forging.

Boiling water nuclear reactors typically include a reactor core located within a reactor pressure vessel (RPV). A known RPV includes a substantially cylindrical shell. The shell, for example, can be about 60 feet long, about twenty feet in diameter, and about seven inches thick. Because of its length, the shell is formed from a plurality of rings or shell courses welded together. The cylindrical shell is closed at its top end by a removable top head. The top head is removable so that components located in the RPV can be accessed. The RPV cylindrical shell is closed at its bottom end by a dome shaped bottom head assembly welded to the shell.

A plurality of nozzle openings are formed in the cylindrical shell for attachment of the pressure vessel to external pipes. Structural design standards dictate that when an opening is made in a pressure vessel, reinforcing material must be added around the opening. In addition, any weld joint used to attach nozzle reinforcing materials and connecting pipes need to be 100% volumetric inspectable.

Known pressure vessel shell courses are made in sections from either a one-piece forging or formed and welded plate. The sections are either welded or bolted together to form the complete vessel. When the shell courses are fabricated from formed and welded plate, longitudinal weld joints are formed that have increased stress levels compared to circumferential weld joints. The nozzles are made from forgings, which are welded into bores in the cylindrical sections, or shell courses, of the pressure vessel. The nozzle forging contains the reinforcing material necessary to ensure the integrity of the nozzle, and weld preps for the nozzle-shell and nozzle-pipe weld joints.

Periodically, known pressure boundary welds in nuclear pressure vessels are volumetrically inspected using ultrasonic testing to determine weld integrity. Accordingly, inspection equipment is required and the plant is configured to provide access for inspection.

Known pressure vessels and processes for making pressure vessels have several disadvantages. First, the nozzle forging to shell welds must be periodically inspected. This inspection process is time consuming and utilizes large amounts of labor and financial resources. In addition, the reliability of the reactor pressure vessel depends on the integrity of the individual nozzle forging to shell welds.

It is therefore desirable to provide a pressure vessel that includes fewer welded joints than current pressure vessels, meets all stress requirements and which eliminates vertical weld joints.

BRIEF SUMMARY OF THE INVENTION

In an exemplary embodiment, a pressure vessel for a nuclear reactor includes at least one unitary forged nozzle shell course. Unitary forged nozzle shell courses simplify the reactor pressure vessel fabrication process and reduces weld joints in the pressure vessel. The pressure vessel has a substantially cylindrical shape and includes a plurality of ring shaped shell courses welded together. At least one shell course is a forged shell course that includes at least one reinforcement portion having an enlarged thickness that extends radially outward, and a nozzle machined into the reinforcing portion of the forged shell course wall. A bore extends from an inside surface of the forged shell course to the outer end of the nozzle. The reinforcing portion and the nozzle are machined from one ring forging of sufficient thickness to form a unitary shell course that includes at least one nozzle reinforcement projecting from the outer wall. The nozzle has a radius $R_n$, and the nozzle bore has a radius $R_{nb}$. The reinforcement portion includes a longitudinal dimension and a circumferential dimension. The longitudinal dimension is about two times the nozzle radius $R_n$, and the circumferential dimension is about 1.5 times the nozzle radius $R_n$.

The forged nozzle shell course is fabricated by providing a ring forging having a desired inside diameter and a thickness that is equal to a desired shell wall thickness plus at least the thickness of the reinforcing portion. The nozzle is formed in the forged nozzle shell course by machining the ring forging to form a reinforcing portion projecting radially outward from the shell wall and a nozzle machined into the reinforcing portion. The nozzle bore, having radius $R_{nb}$, is machined to be coaxial with the nozzle and to extend from the outer end of the nozzle through the shell wall to the inner surface of the shell wall.

The above described forged nozzle shell course eliminates pressure boundary weld joints between separate nozzle forgings and the shell course and therefore, provides a reactor pressure vessel with a reduced number of weld joints that need to be inspected during service. A reduced number of welded joints improves structural integrity of the RPV. Also, the above described forged nozzle shell course simplifies the reactor pressure vessel fabrication process and eliminates the need for inspections of nozzle to shell welds.

DETAILED DESCRIPTION OF THE INVENTION

Figure 1:
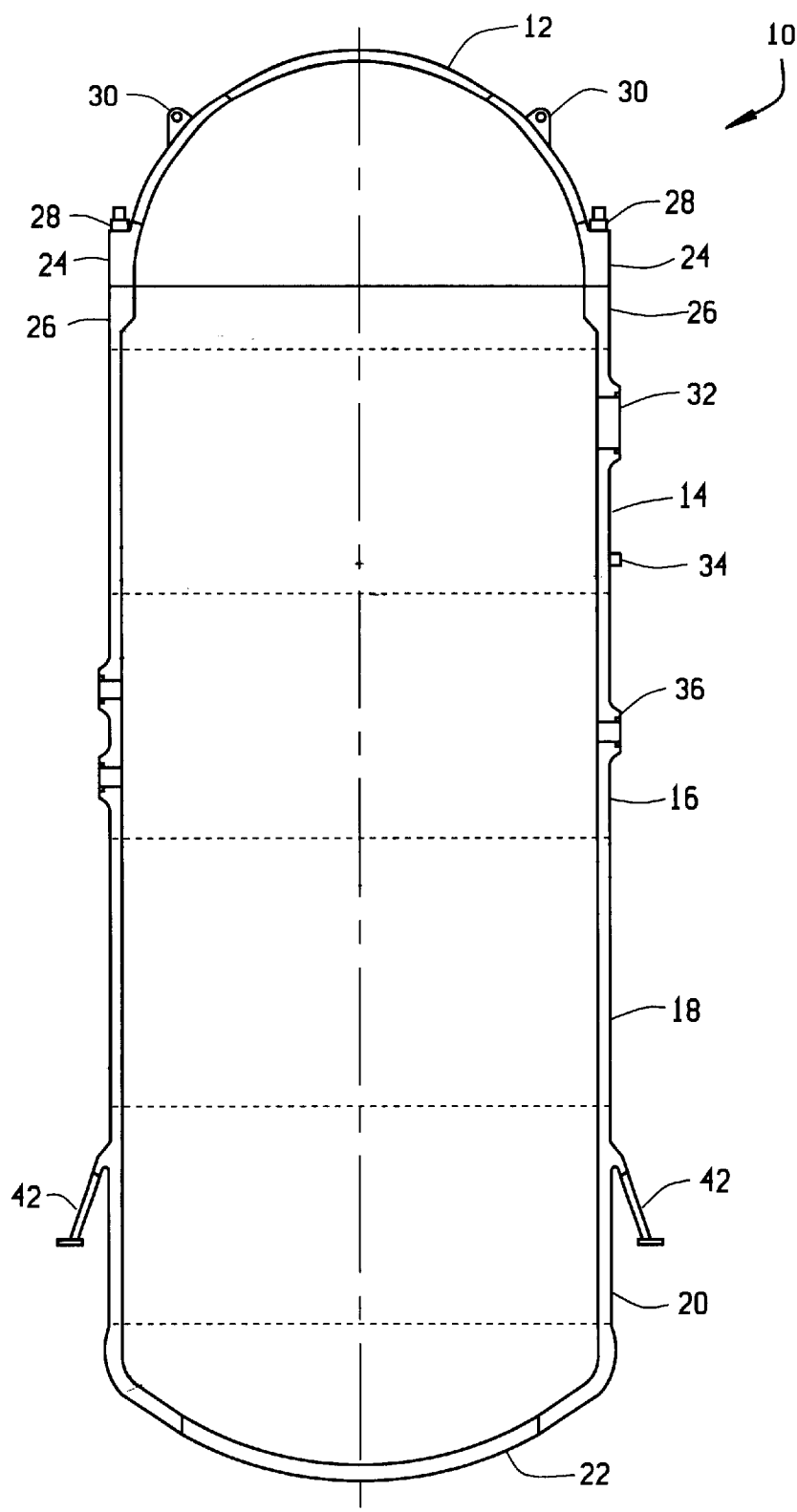
FIG. 1 is a schematic illustration of a reactor pressure vessel in accordance with one embodiment of the present invention.

FIG. 1 is a schematic illustration of a reactor pressure vessel (RPV) 10. RPV 10 includes a top head 12, four substantially cylindrical shell courses 14, 16, 18 and 20, and a bottom head assembly 22. In accordance with an exemplary embodiment of the present invention, shell course 16 is a unitary forged nozzle shell course 16. Top head 12 includes a head flange 24. First shell course 14 includes a vessel flange 26. Top head 12 is bolted to shell course 14 by bolts 28, which extend through head flange 24. Top head 12 also includes lifting flanges 30 to lift top head 12 from first shell course 14.

First shell course 14 includes main steam nozzles 32 through which stem flows out of the RPV 10. Stabilizer brackets 34 also are formed on first shell course 14. Forged nozzle shell course 16 includes a plurality of forged nozzles 36 formed therein. Forged nozzle shell course 16 and forged nozzles 36 are machined from one forging to form a unitary forged nozzle shell course 16. Fourth shell course 20 includes a support skirt 42 welded thereto. Support skirt 42 supports RPV 10 within the reactor building (not shown).

Figure 2:
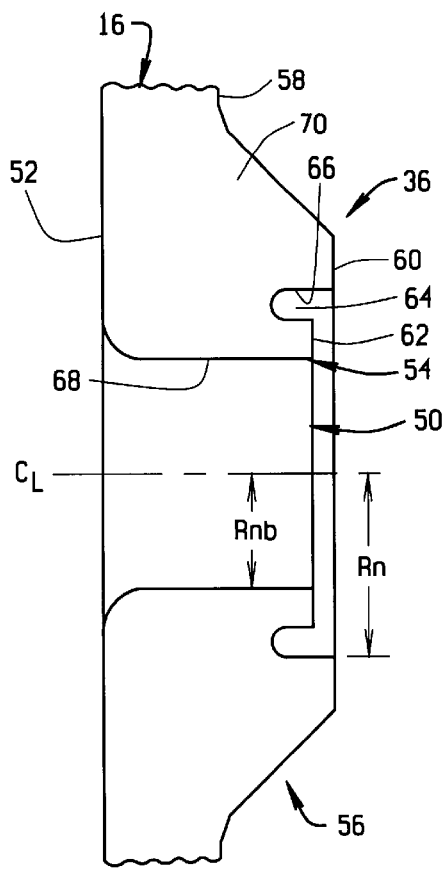
FIG. 2 is a sectional view of a forged nozzle shell course shown in FIG. 1.

FIG. 2 is a cross-sectional view of a portion of forged nozzle shell course 16 with forged nozzle 36. Forged nozzle 36 is unitary with forged nozzle shell course 16. Forged nozzle 36 is machined from the mass of shell course 16. Because shell course 16 and forged nozzle 36 are machined from one forging, the number of welds in RPV 10 are reduced. This has the advantage of reducing the number of welds subject to service inspections and more simplified fabrication of RPV 10.

Nozzle 36 includes a bore 50 extending from an inside surface 52 of shell course 16 to an outer end 54 of nozzle 36. Shell course 16 includes a reinforcing portion 56 extending from an outer surface 58 of shell course 16. Nozzle 36 is machined into reinforcing portion 56 such that outer end 54 of nozzle 36 does not extend past an outer surface 60 of reinforcing portion 56. In other words, nozzle outer end 54 is set back from outer surface 60 of reinforcing portion 56. Outer end 54 of nozzle 36 defines a safe end or extension attachment surface 62. A groove 64 machined into reinforcing portion 56 is coaxial with nozzle bore 50. Groove 64 permits access to nozzle 36 outer end 54 for welding an extension or safe end (not shown in FIG. 2) to attachment surface 62. The distance from the centerline of bore 50 to a surface 66 of groove 64 is defined as a radius $R_n$ of nozzle 36. The distance from the centerline of bore 50 to an inner surface 68 of bore 50 is defined as a radius $R_{nb}$ of nozzle bore 50.

Figure 3:
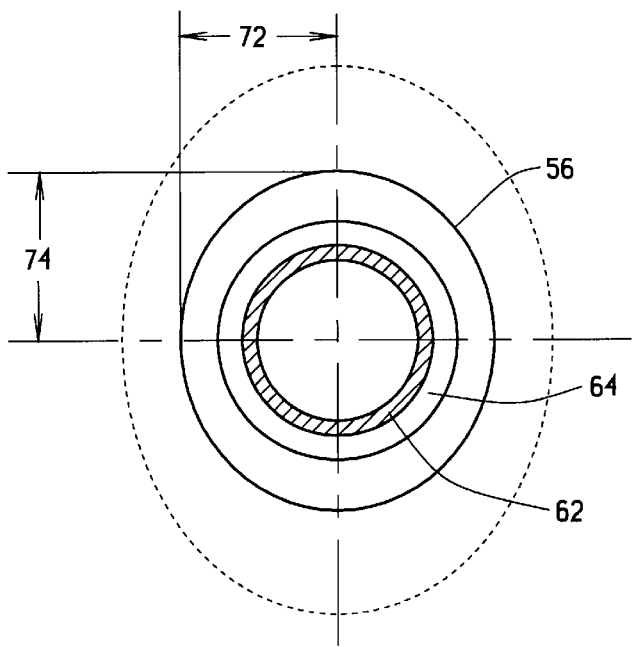
FIG. 3 is a front view of the forged nozzle shown in FIG. 2.

Reinforcing portion 56 includes a transition section 70 which tapers from outer surface 60 of reinforcing portion 56 to outer surface 58 of shell course 16. Referring to FIG. 3, reinforcing portion 56 has an elliptical shape and includes a cirumferential dimension 72 and a longitudinal dimension 74. In an exemplary embodiment circumferential dimension 72 is equal to about 1.5 times nozzle radius $R_n$, and longitudinal dimension 74 is equal to about 2.0 times nozzle radius $R_n$, measured from the centerline of nozzle bore 50.

Referring to FIG. 2, the wall thickness of shell course 16 is chosen to permit shell course 16 to withstand the stresses and pressures exerted on RPV 10. Reinforcing portion 56 provides added reinforcement and strength to shell course 16 at a penetration through shell course 16. In one embodiment, the thickness of reinforcing 56 is chosen so that the sum of the wall thickness of shell course 16 and the thickness of reinforcing portion 56 is about two times the wall thickness of shell course 16. In other embodiments the total thickness can be greater than or less than two times the wall thickness of shell course 16 depending on the material that shell course 16 is manufactured from and/or the expected stresses and pressures exerted on RPV 10. Shell course 16 is manufactured from any suitable material, for example, low alloy steel, stainless steel, and the like.

Forged nozzle shell course 16 is fabricated by starting with a simple ring forging having an inside diameter approximately equal to the desired inside diameter of shell course 16, and having a wall thickness approximately two times the desired thickness of shell course 16. Inside surface 52 of shell course 16 is machined to the desired inside diameter of shell course 16. Outer surface 58 of shell course 16 is machined to define reinforcement portions 56. A bore 50 is machined through each reinforcement portion 56 extending from outer surface 60 of reinforcing portion 56 to inside surface 52 of shell course 16. Nozzle 36 is completed by machining groove 64 into reinforcement portion outer surface 60 so that groove 64 is coaxial with nozzle bore 50. Extension attachment surface 62 is formed by machining outer surface 60 between groove 64 and bore 50. Extension surface 62 is set back from outer surface 60 of reinforcing portion 56. The material that is machined from the simple ring forging can be recycled to minimize the costs of production.

Figure 4:
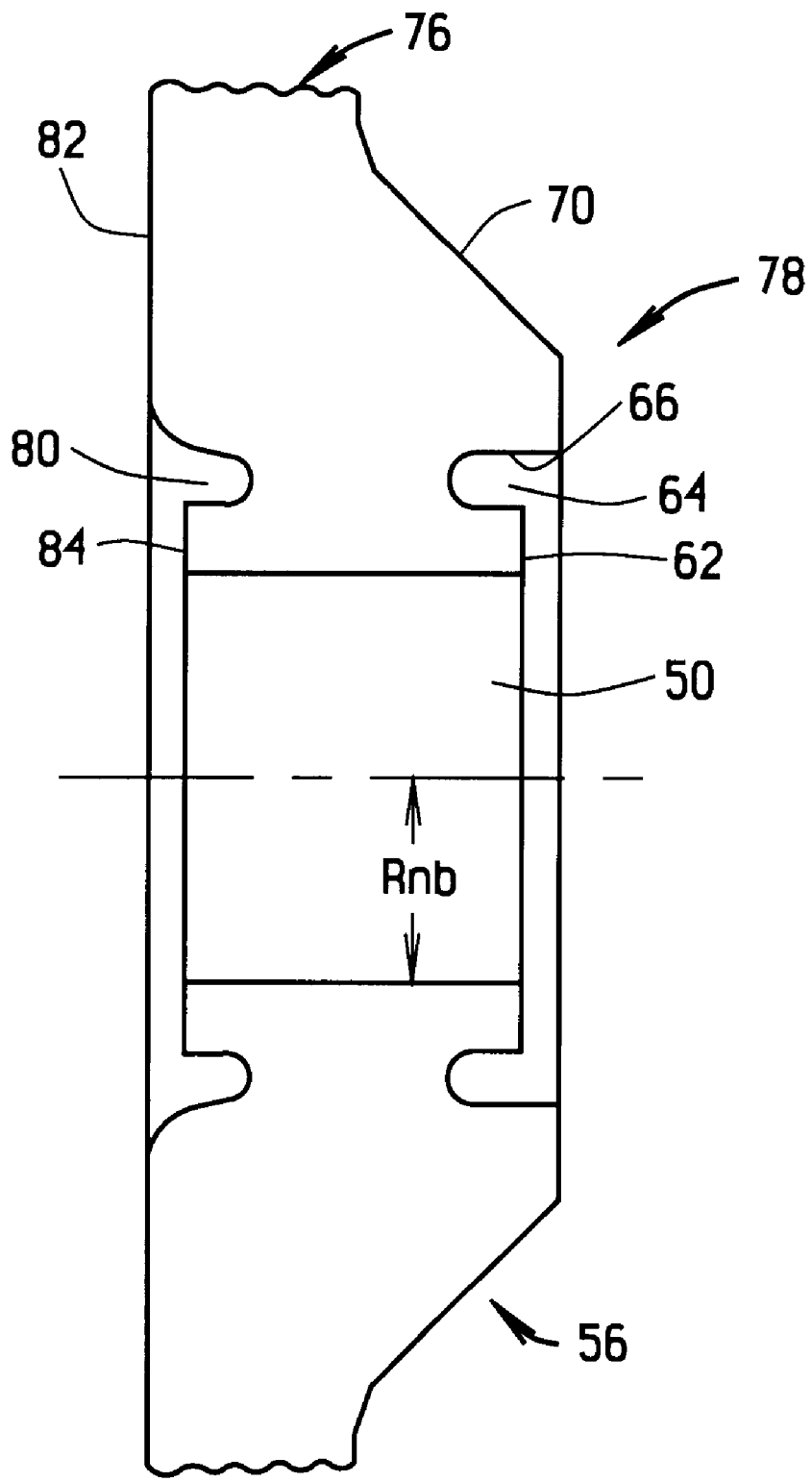
FIG. 4 is a sectional view of a forged nozzle shell course shown in FIG. 1 in accordance with another embodiment of the present invention.

FIG. 4 is a sectional view of a forged nozzle shell course 76 in accordance with another embodiment of the present invention. Forged nozzle shell course 76 includes a forged nozzle 78 similar to forged nozzle 36 described above except that nozzle 76 also includes a second groove 80 machined into an inner surface 82 of forged nozzle shell course 76 and includes a second extension attachment surface 84 set back from inner surface 82 of shell course 76. As described above, Forged nozzle shell course 76 includes a reinforcing portion 56 having a transition section 70, a circumferential dimension 72 and a longitudinal dimension 74 (shown in FIG. 3). Forged nozzle includes a bore 50, having a radius $R_{nb}$, a groove 64 having a surface 66, and an extension attachment surface 62 set back from outer surface 60 of reinforcing portion 54.

Figure 5:
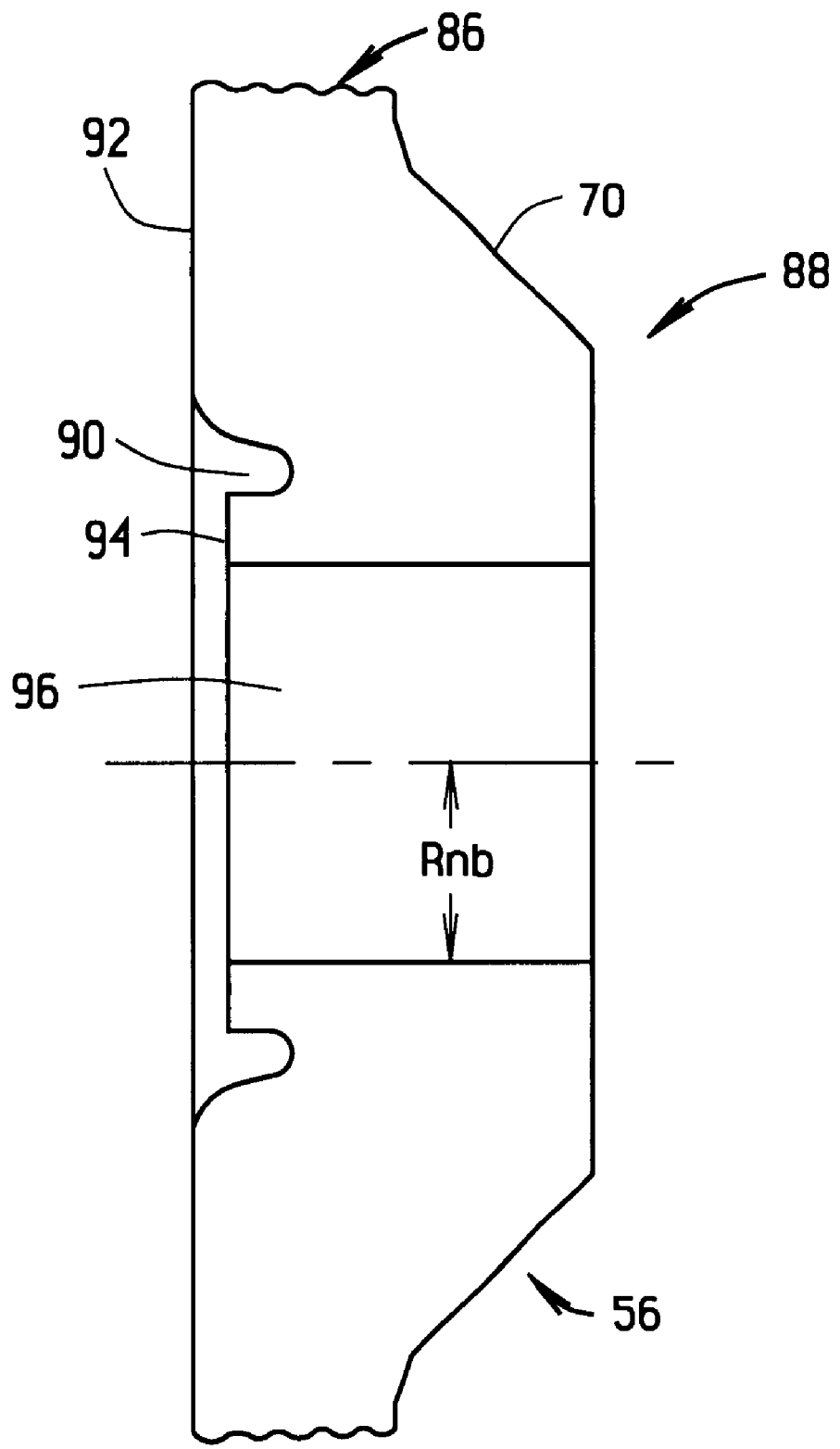
FIG. 5 is a sectional view of a forged nozzle shell course shown in FIG. 1 in accordance with another embodiment of the present invention.

FIG. 5 is a sectional view of a forged nozzle shell course 86 in accordance with another embodiment of the present invention. Forged nozzle shell course 86 includes a forged nozzle 88 that includes a groove 90 machined into an inner surface 92 of forged nozzle shell course 86 and includes an extension attachment surface 94 set back from inner surface 92 of shell course 86. Forged nozzle 88 includes a bore 96, having a radius $R_{nb}$. As described above, forged nozzle shell course 86 includes a reinforcing portion 56 having a transition section 70, a circumferential dimension 72 and a longitudinal dimension 74 (shown in FIG. 3).

Figure 6:
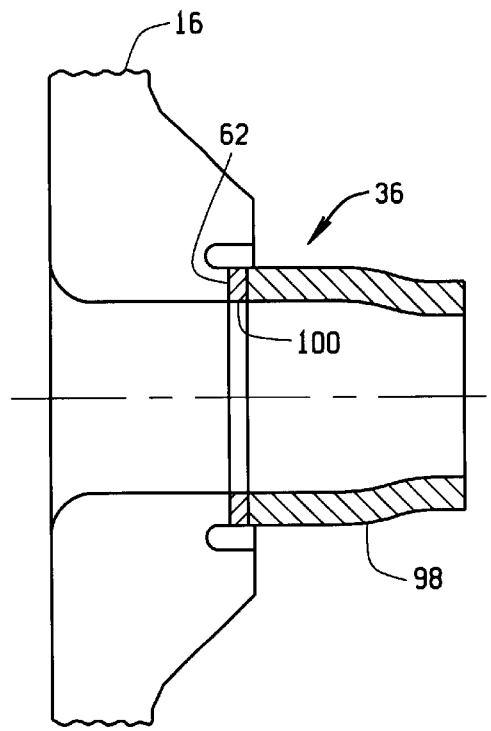
FIGS. 6 is a sectional view of the forged nozzle shown in FIG. 2 with a safe-end attached.
Figure 7:
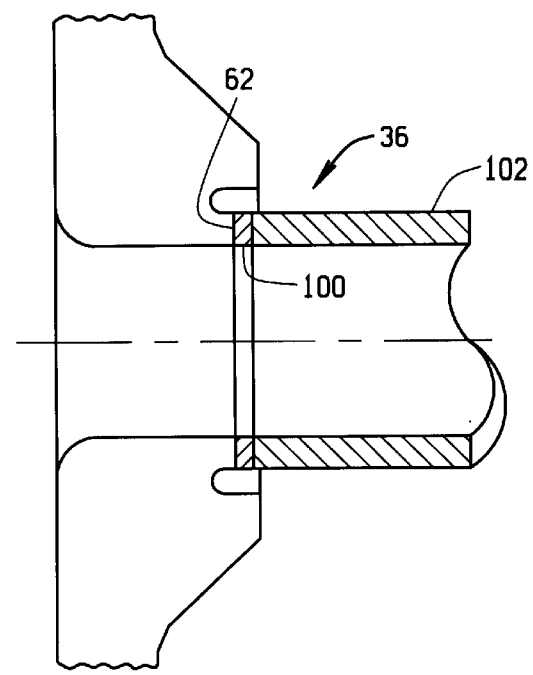
FIG. 7 is a sectional view of the forged nozzle shown in FIG. 2 with a pipe attached.

FIG. 6 is a view of forged nozzle 36, described above, where a safe-end 98 is welded to extension attachment surface 62. Weld butter 100 is located on extension attachment surface 62 to facilitate welding safe end 98 to nozzle 36. In an alternative embodiment, shown in FIG. 7, a pipe 102 is welded to extension attachment surface 62 of forged nozzle 36. These weld joints are not part of the pressure boundary of shell course 16 and therefore are not necessary to resist the hoop and axial stresses in shell course 16. These weld joints are part of the attachment pressure boundary and need to resist the hoop and axial stresses in the attachment, safe end 98 or pipe 102.

Figure 8:
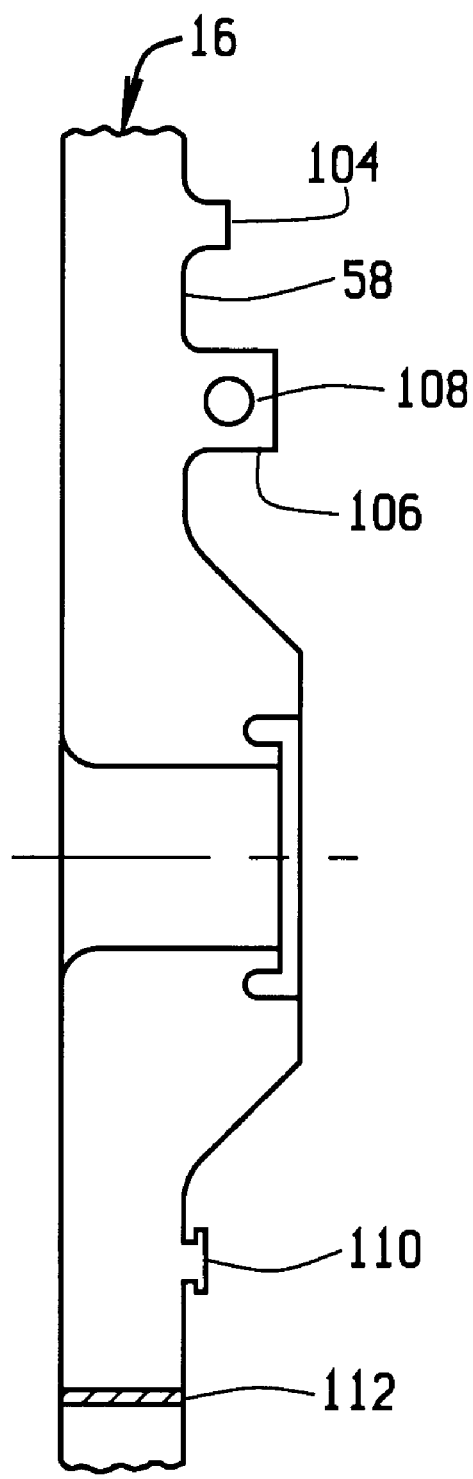
FIG. 8 is a schematic illustration of a forged nozzle shell course with machined integral features in accordance with an embodiment of the present invention.

FIG. 8 is a sectional view of forged nozzle shell course 16 described above and including additional machined integral features. More specifically, forged nozzle shell course 16 includes machined integral stub 104 for attachment of a bracket to RPV 10. Integral stub 104 projects radially outward from outer surface 58 of shell course 16, and similar to reinforcement portion 54, is machined from the same ring forging as shell course 16 as described above. Forged nozzle shell course 16 also includes a machined integral bracket 106 extending radially outward from outer surface 58. Integral bracket 106 includes an opening 108 extending therethrough. Forged nozzle shell course 16 further includes machined integral track 110 for attachment of an inspection apparatus. Integral track 110 projects radially outward from outer surface 58. Integral track 104 is machined to facilitate mounting fixtures for girth weld 112 inspection.

While the invention has been described in terms according to various specific embodiments, those skilled in the art will recognize that the invention can be practiced with modification within the spirit and scope of the claims.

What is claimed is:

1. A forged nozzle shell course for a pressure vessel, said shell course comprising at least one reinforcement portion extending radially outward from an outer surface of said shell course, each said reinforcing portion comprising a nozzle having a radius, said nozzle comprising:

a bore extending from an outside surface of said reinforcing portion to an inside surface of said shell course; and at least one extension attachment surface located adjacent to and coaxial to said bore, said at least one extension attachment surface set back from said outside surface of said reinforcing portion, said reinforcing portion comprising a longitudinal dimension equal to about 2.0 times said radius of said nozzle, and a circumferential dimension equal to about 1.5 times the radius of said nozzle, measured from the centerline of said nozzle bore, said shell course, said at least one reinforcing portion, and said nozzle machined from one forging forming one unitary shell course.

2. A forged nozzle shell course according to claim 1 further comprising an integral groove extending into an outer end of said nozzle, said groove coaxial with said nozzle bore and located adjacent an extension attachment surface.

3. A forged nozzle shell course according to claim 1 further comprising an integral groove extending into said inner surface of said shell course said groove coaxial with said nozzle bore and located adjacent an extension attachment surface.

4. A forged nozzle shell course according to claim 2 further comprising an integral groove extending into said inner surface of said shell course said groove coaxial with said nozzle bore and located adjacent an extension attachment surface.

5. A forged nozzle shell course according to claim 1 further comprising an integral stub projecting radially outward from said outer surface of said shell course for attaching a bracket.

6. A forged nozzle shell course according to claim 1 further comprising an integral bracket projecting radially outward from said outer surface of said shell course.

7. A forged nozzle shell course according to claim 1 further comprising an integral track stub projecting radially outward from said outer surface of said shell course for attaching an inspection apparatus to said shell course.

8. A forged nozzle shell course according to claim 1, further comprising an extension sleeve welded to an extension attachment surface.

9. A forged nozzle shell course according to claim 1, further comprising at least one of a safe end and a pipe welded to the forged nozzle.

10. A pressure vessel comprising:

a plurality of forged shell courses wherein at least one forged shell course comprises at least one reinforcement portion extending radially outward from an outer surface of said shell course, each said reinforcing portion comprising a nozzle having a radius, said nozzle comprising:

a bore extending from an outside surface of said reinforcing portion to an inside surface of said shell course; and at least one extension attachment surface located adjacent to and coaxial to said bore, said at least one extension attachment surface set back from said outside surface of said reinforcing portion, said reinforcing portion comprising a longitudinal dimension equal to about 2.0 times the radius of said nozzle, and a circumferential dimension equal to about 1.5 times the radius of said nozzle, measured from the centerline of said nozzle bore, said at least one shell course, said at least one reinforcing portion, and said nozzle machined from one forging forming one unitary shell course;

a top head coupled to a first forged shell course; and a bottom head assembly coupled to a last shell course.

11. A pressure vessel according to claim 10 wherein said at least one forged shell course further comprises an integral groove extending into an outer end of said nozzle, said groove coaxial with said nozzle bore and located adjacent an extension attachment surface.

12. A pressure vessel according to claim 11 wherein said at least one forged shell course further comprises an integral groove extending into said inner surface of said at least one forged shell course said groove coaxial with said nozzle bore and located adjacent an extension attachment surface.

13. A pressure vessel according to claim 10 wherein said at least one forged shell course further comprises an integral groove extending into said inner surface of said at least one forged shell course said groove coaxial with said nozzle bore and located adjacent an extension attachment surface.

14. A pressure vessel according to claim 10 wherein said at least one forged shell course further comprises an integral track projecting radially outward from an outer portion of a shell wall of said shell course for attaching an inspection apparatus to said shell course.

15. A pressure vessel according to claim 10 wherein said at least one forged shell course further comprises an integral bracket projecting radially outward from an outer portion of a shell wall of said shell course.

16. A pressure vessel according to claim 10 wherein said at least one forged shell course further comprises at least one of a safe end and a pipe welded to said forged nozzle.

* * * * *